A. A. CASSIDY.
DISPENSER.
APPLICATION FILED JUNE 1, 1911.
1,050,339.
Patented Jan. 14, 1913.
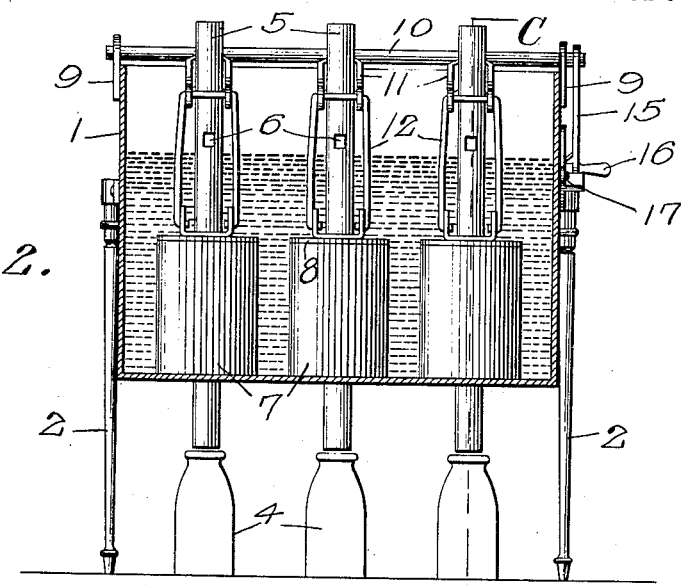
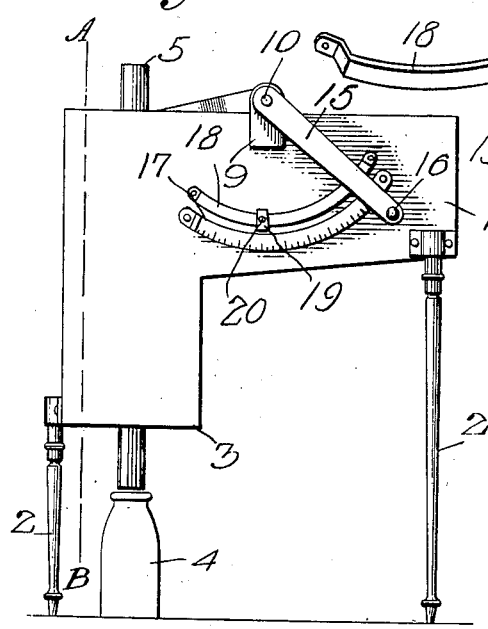
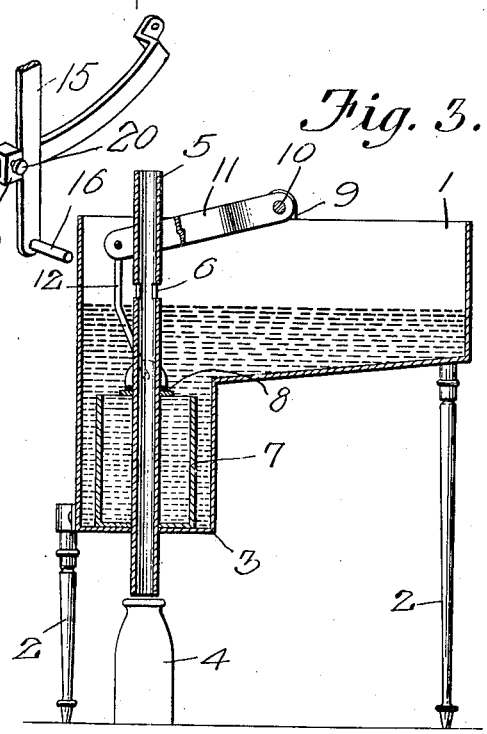
Witnesses
Alfred A. Cassidy Inventors
by
Attorneys

UNITED STATES PATENT OFFICE.

ALFRED A. CASSIDY, OF MINNEAPOLIS, MINNESOTA.

DISPENSER.

1,050,339.  Specification of Letters Patent.  Patented Jan. 14, 1913.

Application filed June 1, 1911. Serial No. 630,556.

*To all whom it may concern:*

Be it known that I, ALFRED A. CASSIDY, a citizen of the United States, residing at Minneapolis, in the county of Hennepin and State of Minnesota, have invented a new and useful Dispenser, of which the following is a specification.

The device forming the subject matter of this application, is adapted to be employed for delivering predetermined quantities of material from a supply tank, into receptacles of various sorts.

It is the object of the invention to provide a novel means for elevating the contents of the tank, and for discharging the contents of the tank, in varying quantities, into a conductor, which, in its turn, discharges into the receptacle which is to be filled.

A further object of the invention is to provide a device of the character above specified, in which the conducting member which discharges into the receptacle which is to be filled, constitutes a means for mounting the container, whereby predetermined quantities of liquid, are elevated, and discharge into the conductor.

A further object of the invention is to provide novel means for producing relative movement between the container and the conductor, and to provide novel means whereby the operator may set the mechanism to deliver different quantities.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in end elevation; Fig. 2 is a vertical section upon the line A—B of Fig. 1; Fig. 3 is a vertical section on the line C—D of Fig. 2; and Fig. 4 is a detail perspective showing a portion of the operating mechanism, and the means whereby said portion of the operating mechanism is regulated and adjusted, so that the device may deliver predetermined, different quantities.

In carrying out the invention there is provided, as a primary element, a tank, denoted generally by the numeral 1, the tank being suitably supported upon legs 2, or in any other desired manner. The tank may be of any form. Preferably, however, as shown, the tank is equipped, adjacent its front, with a depending extension 3.

The tank 1 may be of any length, so that any desired number of receptacles may be filled simultaneously. With this end in view, the invention comprises a plurality of delivery mechanisms, three of these mechanisms being shown. These several delivery mechanisms are duplicates of each other, and but one of them will be described, it being understood without further explanation, that this description will apply with equal propriety, to all of the delivery mechanisms.

In fashioning each delivery mechanism, then, a conductor is provided, through which the liquid in the tank 1 may pass into the receptacle 4 which is to be filled. This conductor takes the form of a tube 5, the upper end of which upstands above the upper edge of the tank 1, the lower end of the tube 5 being carried downwardly through the bottom of the extension 3 of the tank. In the tube 5 relatively near to the top of the tube, but well within the contour of the tank 1, is an opening 6.

The tube 5 extends through the bottom of a container 7, preferably of cylindrical form, the container 7 being open at the top. Secured to the top of the container 7 is a bridge piece 8, through which the tube 5 extends. The construction, therefore, is such that the container 7 is mounted for movement in a right line upon the tube 5.

Mechanism is provided for raising and lowering the container 7. In fashioning this mechanism, bearings 9 are secured to the ends of the tank 1, and in these bearings, is journaled for rotation a shaft 10. Secured to the shaft 10 are a plurality of bifurcated crank arms 11, and through each of the crank arms 11 is extended an arched link 12, the lower ends of the link 12 being pivotally engaged with the ends of the yoke 14, secured to the bridge piece 8. To one end of the shaft 10, upon the outside of the tank 1, an arm 15 is secured, the same having an outstanding handle 16. From the foregoing it will be seen that by manipulating the handle 16, the container 7 may be reciprocated upon the tube 5.

A means is provided whereby the lifting movement of the container 7 may be regulated, so that the container will discharge different, predetermined quantities into the tube 5. With this end in view, the scale 17, suitably graduated to indicate different units of volume, is mounted upon one end of the tank 1, in the vicinity of the arm 15, the arm 15 being adapted to register upon the successive graduations of the scale 17. Secured to the tank 1 in the vicinity of the scale 17, is a bracket 18, upon which is mounted, slidably, a stop 19. The stop 19 is held in place upon the bracket 18 by a set screw 20. The stop 19 may be positioned adjacent any of the graduations of the scale 17, and when the arm 15 is swung about, the arm will come into contact with the stop 19. At this point it may be stated that the form of the stop, and the manner of mounting the same may be varied, it being necessary merely, that some suitable means be provided, whereby the handle 15 may be arrested in its movement, opposite to each and all of the graduations upon the scale 17.

The operation of the device is as follows: The tank 1 is filled with the liquid to be dispensed, to a level slightly below the openings 6 in the tubes 5, as shown in Fig. 3. The set screw 20 is loosened, and the stop 19 is slid upon the bracket 18, until the stop 19 is positioned opposite the desired graduation upon the scale 17, the particular graduation referred to, representing the volume of liquid which is to be delivered into each of the receptacles 4. By manipulating the set screw 20, the stop 19 may be held in its adjusted position. The receptacles 4 are positioned below the lower ends of the tubes 5, the containers 7 resting upon the bottom of the extension 3 of the tank, the upper ends of the containers 7 being well below the level of the liquid in the tank, so that the containers will be filled with liquid. The handle 16 is now seized, and the arm 15 is swung about, causing a rotation of the shaft 10, and a consequent lifting of the free ends of the crank arms 11, the arms 11 elevating the links 12 which are pivotally carried by the arms, the links 12, in their turn, through the instrumentality of the yokes 14 and the bridge pieces 8, elevating all of the containers 7, simultaneously, the containers sliding upwardly upon the tubes 5. When the containers 7 are thus elevated, their upper edges will be raised above the openings 6, so that the liquid which is in the containers 7, will flow through the openings 6, and thence downwardly through the tubes 5 into the receptacles 4, the liquid thus continuing to flow into the receptacles, until the members 7 are drained to the level of the openings 6 in the tubes 5. When the arm 15 is swung about, to cause a rotation of the shaft 10, the arm 15 will come into contact with the stop 19. This stop 19, as has been pointed out heretofore, will have been previously set, to indicate a given volume. The engagement between the stop 19 and the arm 15 will permit the containers 7 to be elevated to such an extent only, that the predetermined quantity of liquid will flow through the openings 6, it being obvious that the nearer the openings 6 are to the bottom of the container 7, the greater will be the volume of liquid delivered into the receptacles 4. Owing to the fact that the openings 6 are fashioned in the tubes 5, it is not necessary to elevate the containers 7 until the bridges 8 are above the upper ends of the tubes 5, in order that the containers 7 may discharge into the tubes. The bridges 8, therefore, are made effective, throughout the entire stroke of each container, to regulate the sliding movement of the container. Moreover, the openings 6 serve to maintain the liquid level below the crank arms 11, which operate within the tank.

From the foregoing it will be seen that by simply manipulating the arm 15, a large number of receptacles may be filled, or partially filled, simultaneously, with a given volume of liquid.

The device is adapted to be employed for filling bottles, large gasolene cans, and receptacles of any other sort, the contents of which must be measured.

Having thus described the invention what is claimed is:—

A device of the class described comprising a tank having a depending extension; a shaft journaled upon the tank; an arm secured to the shaft; a link connected with the arm; a tube protruding through the bottom of the extension; a container slidable upon the tube; and a single element constituting at once a guide for the container and a place of attachment for the link, said element consisting of a bridge secured across the top of the container and slidable upon the tube, the bridge having means for pivotally receiving the link; there being an opening in the tube, through which opening the container is adapted to discharge, the free end of the arm being above the opening, when the container rests upon the bottom of the extension.

In testimony that I claim the foregoing as my own, I have hereto affixed my signature in the presence of two witnesses.

ALFRED A. CASSIDY.

Witnesses:
ADOLF ANDERSON,
H. O. SKUTTLES.